Dec. 18, 1928.
J. W. PROCTOR
CLOTHESLINE HOLDER
Filed Jan. 23, 1928
1,696,056
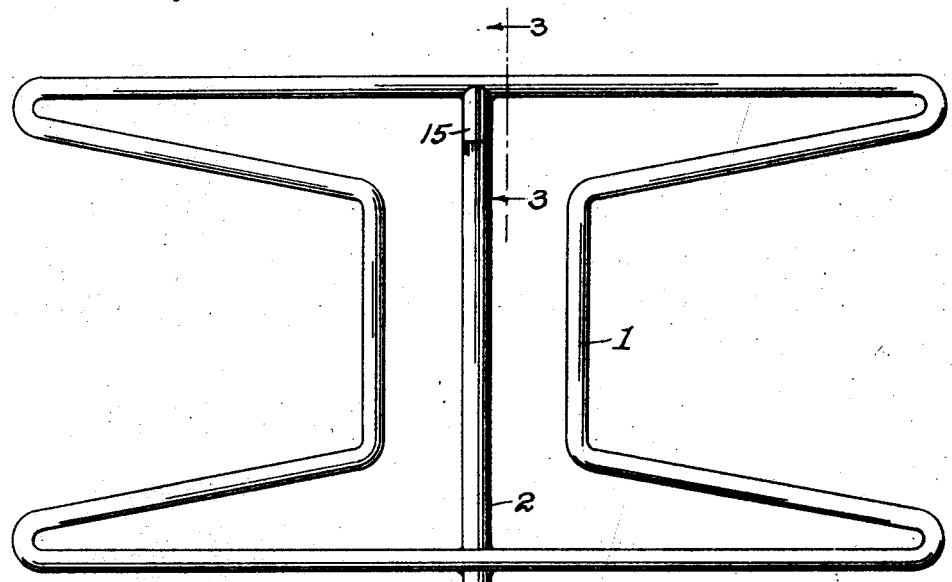
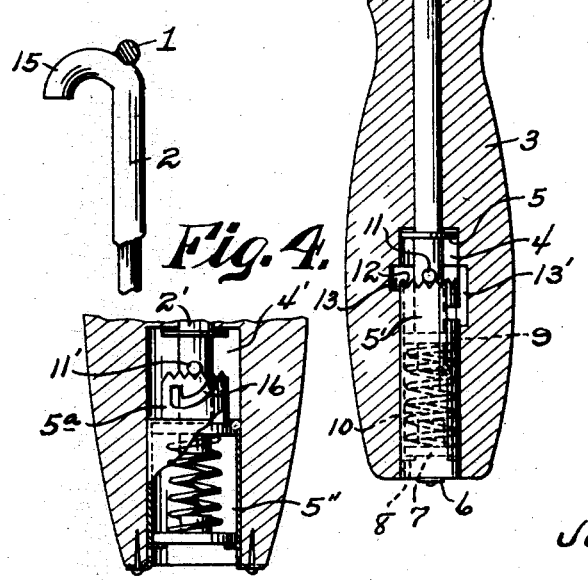
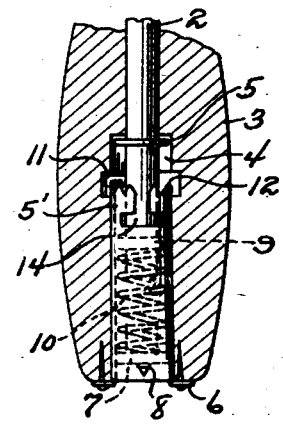
John W. Proctor
INVENTOR Patented Dec. 18, 1928.

1,696,056

UNITED STATES PATENT OFFICE.

JOHN W. PROCTOR, OF PITTSBURGH, PENNSYLVANIA.

CLOTHESLINE HOLDER.

Application filed January 23, 1928. Serial No. 248,907.

This invention relates to a reel for clothes lines and the like, the general object of the invention being to rotatably connect the reel with its handle, with means for locking the reel to the handle when desired.

Another object of the invention is to provide brake means for preventing the reel from having too free movement.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of the improved reel, with the handle in section.

Figure 2 is a sectional view through the handle, the view being taken a quarter turn from that shown in Figure 1.

Figure 3 is a section on line 3—3 of Figure 1.

Figure 4 is a sectional view with parts in elevation, showing a modification.

In these views, 1 indicates the reel which is formed of wire and 2 indicates the rod to which the reel is connected by spot welding or the like. The handle is shown at 3 and has a bore therein through which the rod passes, the bore ending in a socket 4 into which the end of the rod extends. A washer 5 is fastened to the rod and is located adjacent the bottom of the socket. A barrel 5' of metal is placed in the socket and has ears 6 at its outer end which are bent over and fastened to the end of the handle. A headed member 7 is held in the outer end of the barrel by the bent-over tongues 8 cut from the barrel, and a second headed member 9 is placed in the barrel, the stems of these two members extending in opposite directions. A coil spring 10 is placed in the barrel between the two members, this spring tending to force the inner member 9 against the end of the stem which acts to press the washer 5 against the bottom of the recess.

A pin 11 projects from the rod within the socket and the inner end of the barrel is provided with the teeth 12 which are engaged by the pin so that the pin, passing over the teeth, acts as a brake to prevent the reel from rotating too freely. An annular groove 13 is formed in the walls of the socket adjacent its inner end through which the end of the pin passes during the rotation of the reel, and the barrel is provided with a T-shaped slot 14 in its inner end to receive the pin when the reel and rod 2 are pressed toward the handle so that the pin can enter one of the notches formed by the head of the T-shaped slot and thus lock the reel to the handle and prevent rotary movement of the reel relative to the handle. A portion of the wall of the socket is grooved, as at 13' to permit the pin to enter the T-shaped slot.

The outer end of the rod 2 is formed with a hook 15 to permit the device to be hung on a clothes line or the like.

In the modification shown in Figure 4, the barrel 5'' is formed with a reduced inner end 5ª which carries the teeth for engagement by the pin 11' on the rod 2' and this reduced end is formed with a bayonet slot 16 which receives the pin when the rod is to be locked to the handle. The inner headed member engages the shoulder formed at the junction of the reduced part with the major portion of the barrel when the washer 2' is pressed against the bottom of the socket. The socket 4' is made much larger in diameter than that shown in the first form of the invention so that it is not necessary to groove the walls thereof to receive the pin.

From the foregoing it will be seen that I have provided simple means for rotatably connecting the reel with its handle and for locking the reel to the handle whenever desired, with means for preventing the reel rotating too freely.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the class described comprising a reel having a stem, a handle rotatably mounted on the stem, means for locking the parts together when desired, such means comprising a pin on the stem and a slotted part in the handle having its slot adapted to receive the pin and spring means for normally holding the pin out of the slot.

2. A device of the class described comprising a reel having a stem, a handle rotatably mounted on the stem, means for locking the parts together when desired, such means comprising a pin on the stem, a slotted part in the handle having its slot adapted to receive the pin, spring means for normally holding the pin out of the slot, and a brake for preventing the free rotation of the reel in relation to the handle.

3. A device of the class described comprising a reel having a stem, a handle having a bore ending in a socket to receive a portion of the stem, a projection on the stem for engaging the bottom of the socket, a pin on the stem arranged in the socket, a barrel in the stem having teeth at its inner end over which the pin passes during the rotary movement of the stem, said barrel also having a slot therein to receive the pin to lock the stem to the handle and spring means in the barrel pressing against the end of the stem to push the stem outwardly.

In testimony whereof I affix my signature.

JOHN W. PROCTOR.